US008390899B2

(12) United States Patent
Suzuki

(10) Patent No.: US 8,390,899 B2
(45) Date of Patent: Mar. 5, 2013

(54) IMAGE SCANNER, AND METHOD AND COMPUTER READABLE MEDIUM THEREFOR

(75) Inventor: Nobuhiko Suzuki, Aichi (JP)

(73) Assignee: Brother Kogyo Kabushiki Kaisha, Nagoya, Aichi (JP)

( * ) Notice: Subject to any disclaimer, the term of this patent is extended or adjusted under 35 U.S.C. 154(b) by 711 days.

(21) Appl. No.: 12/506,667

(22) Filed: Jul. 21, 2009

(65) Prior Publication Data

US 2010/0020362 A1    Jan. 28, 2010

(30) Foreign Application Priority Data

Jul. 22, 2008 (JP) ................................. 2008-188782

(51) Int. Cl.
*H04N 1/04* (2006.01)

(52) U.S. Cl. ........ 358/448; 358/498; 358/494; 358/486; 399/47

(58) Field of Classification Search .................. 358/474, 358/497, 496, 501, 498, 486, 494; 399/47, 399/49
See application file for complete search history.

(56) References Cited

U.S. PATENT DOCUMENTS

| 4,963,920 | A | * | 10/1990 | Fukushima ...................... 355/40 |
| 5,173,735 | A | * | 12/1992 | Kusumoto ..................... 399/302 |
| 5,182,597 | A | * | 1/1993 | Masuda et al. .................. 399/21 |
| 5,481,335 | A | * | 1/1996 | Furuichi et al. ................... 399/9 |
| 5,648,843 | A | * | 7/1997 | Eguchi ........................... 399/364 |
| 5,710,956 | A | * | 1/1998 | Kurohata et al. ............... 399/24 |
| 5,850,478 | A | | 12/1998 | Suzuki et al. |
| 5,995,245 | A | * | 11/1999 | Moro .............................. 358/474 |
| 6,163,342 | A | * | 12/2000 | Suzuki ........................... 348/364 |
| 6,320,673 | B1 | * | 11/2001 | Motosugi ........................ 358/1.9 |
| 6,351,315 | B2 | * | 2/2002 | Kusumoto ................... 358/1.14 |
| 6,449,440 | B1 | | 9/2002 | Sawada |
| 6,510,302 | B1 | * | 1/2003 | Konno et al. .................. 399/208 |
| 7,195,238 | B2 | * | 3/2007 | Suga et al. ..................... 271/228 |
| 7,212,751 | B2 | * | 5/2007 | Kayama et al. ................. 399/21 |
| 7,623,269 | B2 | * | 11/2009 | Higashiura ..................... 358/3.1 |
| 7,693,449 | B2 | * | 4/2010 | Kaseno et al. ................ 399/107 |
| 7,755,813 | B2 | * | 7/2010 | Nishikawa et al. ........... 358/497 |
| 7,787,158 | B2 | * | 8/2010 | Matsuda ........................ 358/462 |

(Continued)

FOREIGN PATENT DOCUMENTS

| JP | HEI9-18643 | 1/1997 |
| JP | 2001-22235 | 1/2001 |

(Continued)

OTHER PUBLICATIONS

Abstract of Japanese Patent Publication No. 7-221969, dated Aug. 18, 1995.

(Continued)

*Primary Examiner* — Negussie Worku

(74) *Attorney, Agent, or Firm* — Scully, Scott, Murphy & Presser, P.C.

(57) ABSTRACT

An image scanner includes a scanning unit configured to scan images on document sheets, an image processing unit configured to perform image processing for the images scanned by the scanning unit under a predetermined condition, an identifying unit configured to identify one or more damaged sheets among the document sheets to be scanned, and a condition setting unit configured to set a specific condition under which the image processing is to be performed for images scanned from the damaged sheets identified by the identifying unit.

10 Claims, 10 Drawing Sheets

U.S. PATENT DOCUMENTS

| | | | |
|---|---|---|---|
| 7,845,631 B2 * | 12/2010 | Wada et al. | 271/152 |
| 7,860,412 B2 * | 12/2010 | Kayama et al. | 399/21 |
| 7,937,005 B2 * | 5/2011 | Hayashi et al. | 399/45 |
| 8,008,610 B2 * | 8/2011 | Asano et al. | 250/205 |
| 8,050,613 B2 * | 11/2011 | Domoto et al. | 399/341 |
| 2010/0020370 A1 | 1/2010 | Ishikawa | |

FOREIGN PATENT DOCUMENTS

| | | |
|---|---|---|
| JP | 3332546 | 7/2002 |
| JP | 2004-29279 | 1/2004 |
| JP | 2004-80548 | 3/2004 |
| JP | 2005-277751 | 10/2005 |
| JP | 2007-163755 | 6/2007 |
| JP | 2007-326650 | 12/2007 |
| JP | 2010-28546 | 2/2010 |

OTHER PUBLICATIONS

Japanese Office Action dated Apr. 27, 2010.
Japanese Office Action with English translation dated Jul. 6, 2010.

* cited by examiner

PLEASE INPUT NUMBER OF JAMMED SHEETS

01

PLEASE PRESS START KEY TO SET YOUR INPUT

FIG.11

PLEASE SELECT INTENSITY OF IMAGE QUALITY CORRECTION FOR JAMMED SHEETS
▲ 1 : LOW
   2 : HIGH
▼ 3 : NO CORRECTION

PLEASE PRESS START KEY TO SET YOUR INPUT

FIG.12

| SORT OF DOCUMENT | IMAGE QUALITY CORRECTION FOR JAMMED SHEETS | GAMMA CORRECTION | THRESHOLD FOR DIGITIZING | ACCENTUATING/SMOOTHING FILTER | | THRESHOLD FOR EDGE DETECTION |
|---|---|---|---|---|---|---|
| | | | | EDGE | OTHERS | |
| CHARACTER DOCUMENT | NO CORRECTION | NORMAL | 128 | ACCENTUATION : HIGH | NO FILTER | LOW |
| | LOW | LOW | 112 | ACCENTUATION : HIGH | SMOOTHING : LOW | HIGH |
| | HIGH | HIGH | 96 | ACCENTUATION : LOW | SMOOTHING : LOW | HIGH |
| PHOTOGRAPH | NO CORRECTION | NORMAL | 128 | – | SMOOTHING : LOW | NO VALUE |
| | LOW | NORMAL | 128 | SMOOTHING : LOW | SMOOTHING : LOW | HIGH |
| | HIGH | LOW | 128 | SMOOTHING : HIGH | SMOOTHING : LOW | HIGH |

FIG.13

|    |    |    |
|----|----|----|
| −1 |  0 |  1 |
| −2 |  0 |  2 |
| −1 |  0 |  1 |

FIG.15

|    |    |    |
|----|----|----|
| −1 | −2 | −1 |
|  0 |  0 |  0 |
|  1 |  2 |  1 |

FIG.16

|    |    |    |
|----|----|----|
|  0 | −1 |  0 |
| −1 |  8 | −1 |
|  0 | −1 |  0 |

FIG.17

|    |    |    |
|----|----|----|
|  0 | −2 |  0 |
| −2 | 12 | −2 |
|  0 | −2 |  0 |

FIG.18

|   |   |   |
|---|---|---|
| 1 | 1 | 1 |
| 1 | 8 | 1 |
| 1 | 1 | 1 |

FIG.19

|   |   |   |
|---|---|---|
| 1 | 2 | 1 |
| 2 | 4 | 2 |
| 1 | 2 | 1 |

IMAGE SCANNER, AND METHOD AND COMPUTER READABLE MEDIUM THEREFOR

CROSS-REFERENCE TO RELATED APPLICATION

This application claims priority under 35 U.S.C. §119 from Japanese Patent Application No. 2008-188782 filed on Jul. 22, 2008. The entire subject matter of the application is incorporated herein by reference.

BACKGROUND

1. Technical Field

The following description relates to one or more techniques to scan images on document sheets, particularly to one or more techniques that make it possible to perform image processing for image data scanned from the document sheets under a predetermined condition.

2. Related Art

An image scanner, which incorporates therein an Automatic Document Feeder (ADF) configured to automatically scan plural document sheets, has been known. In the ADF, document sheets loaded on a document tray are fed to a document scanning position sequentially on a sheet-by-sheet basis. Each document sheet is conveyed by the ADF, and scanned in the document scanning position by a scanner unit, and fed to a catch tray. Image processing for image quality correction is, as required, applied to the scanned image data.

The ADF may interrupt document feeding due to a jam. In such a situation, after interrupting the document feeding, the ADF informs a user of a jam caused with a message displayed. For example, Japanese Patent Provisional Publication No. HE19-18643 discloses, as a process to be executed after a jam occurs, an operation of informing that the user should set predetermined document sheets on the document tray depending on the number of document sheets already scanned.

SUMMARY

However, the aforementioned known image scanner has the following problem. A document sheet which has been jammed in the document feeding is likely to have damages such as folds and wrinkles. On the other hand, the known image scanner performs image processing under the same condition regardless of the state of each document sheet to be scanned, namely, regardless of whether each document sheet to be scanned is damaged or not. Therefore, when a document sheet damaged is scanned, black lines, which lead to degradation of the image quality, may emerge in the scanned data as a result of folds and/or wrinkles of the damaged sheet being accentuated. It is noted that the damaged sheet, that is, a document sheet which is undesired to be scanned is not limited to a sheet damaged due to a jam. For instance, such a document sheet in an undesired state may include a sheet damaged while being transferred and a sheet of originally undesired quality.

Aspects of the present invention are advantageous to provide one or more improved image scanners (and methods and computer readable media therefor) that make it possible to diminish degradation of image quality of image data scanned from a document sheet damaged due to a trouble such as a jam.

According to aspects of the present invention, an image scanner is provided, which includes a scanning unit configured to scan images on document sheets, an image processing unit configured to perform image processing for the images scanned by the scanning unit under a predetermined condition, an identifying unit configured to identify one or more damaged sheets among the document sheets to be scanned, and a condition setting unit configured to set a specific condition under which the image processing is to be performed for images scanned from the damaged sheets identified by the identifying unit.

According to aspects of the present invention, further provided is a method for image scanning that includes a scanning step of scanning images on document sheets, an image processing step of performing image processing for the images scanned in the scanning step under a predetermined condition, an identifying step of identifying one or more damaged sheets among the document sheets to be scanned, and a condition setting step of setting a specific condition under which the image processing is to be performed for images scanned from the damaged sheets identified in the identifying step.

According to aspects of the present invention, further provided is a computer readable medium having computer readable instructions stored thereon, which instructions causes a computer to perform a scanning step of scanning images on document sheets, an image processing step of performing image processing for the images scanned in the scanning step under a predetermined condition, an identifying step of identifying one or more damaged sheets among the document sheets to be scanned, and a condition setting step of setting a specific condition under which the image processing is to be performed for images scanned from the damaged sheets identified in the identifying step.

BRIEF DESCRIPTION OF THE ACCOMPANYING DRAWINGS

Figure 7:
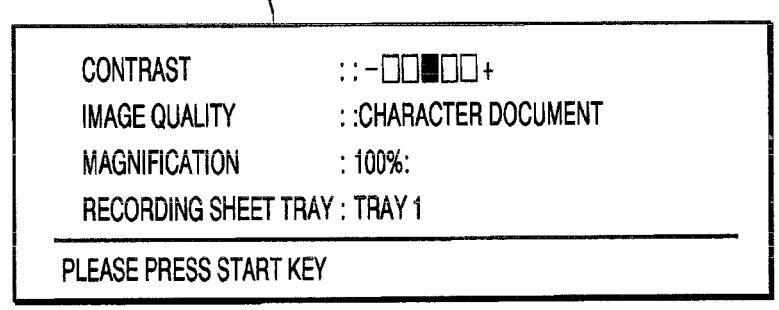

FIG. 7 exemplifies a display shown on a display unit of the MFP to accept inputs for various settings in the embodiment according to one or more aspects of the present invention.

Figure 8:
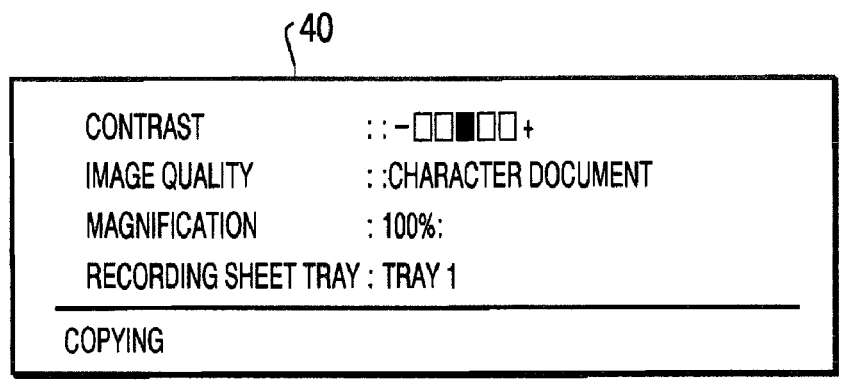

FIG. 8 exemplifies a display shown on the display unit of the MFP during a normal scanning operation in the embodiment according to one or more aspects of the present invention.

Figure 9:
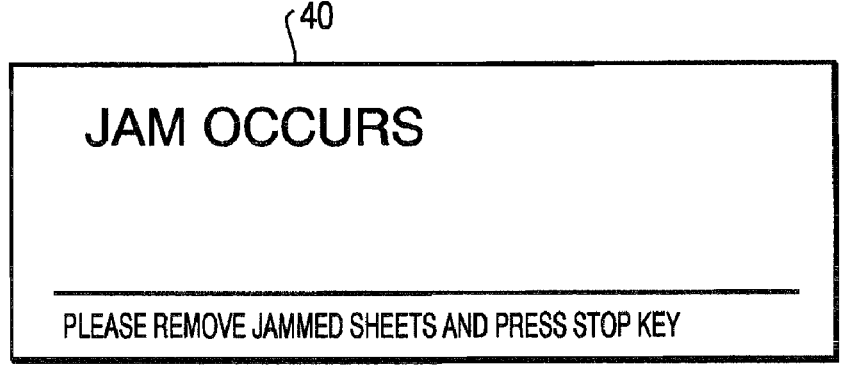

FIG. 9 exemplifies a display shown on the display unit of the MFP when a jam occurs in the embodiment according to one or more aspects of the present invention.

Figure 10:
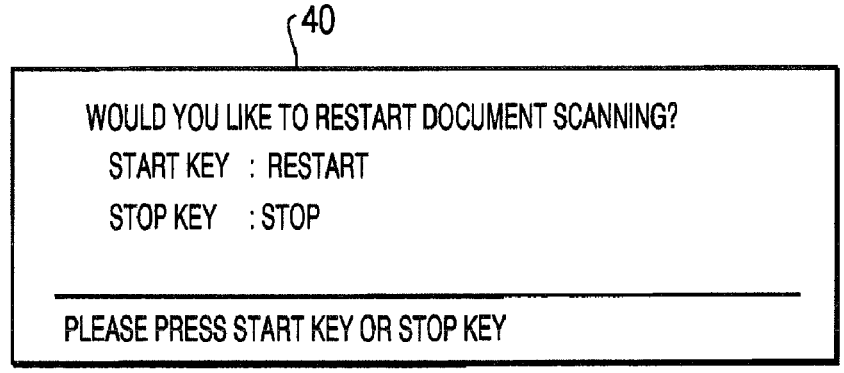

FIG. 10 exemplifies a display shown on the display unit of the MFP to ask whether to resume a scanning process in the embodiment according to one or more aspects of the present invention.

FIG. 11 exemplifies a display shown on the display unit of the MFP to accept an input of the number of "jammed sheets" in the embodiment according to one or more aspects of the present invention.

FIG. 12 exemplifies a display shown on the display unit of the MFP to accept selection of an option for the intensity of correction in the embodiment according to one or more aspects of the present invention.

FIG. 13 shows correction parameters for each type of document in the embodiment according to one or more aspects of the present invention.

Figure 14:
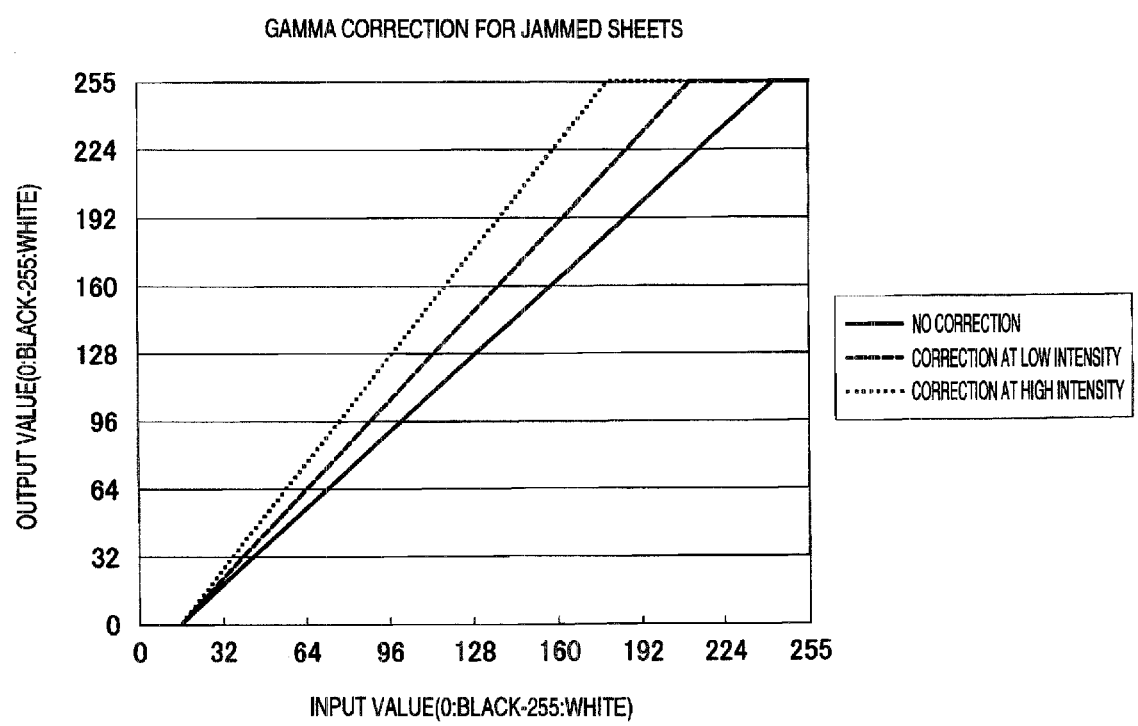

FIG. 14 shows relationship between the input value and the output value in a gamma correction in the embodiment according to one or more aspects of the present invention.

FIG. 15 exemplifies an edge detection filter (the horizontal direction) in the embodiment according to one or more aspects of the present invention.

FIG. 16 exemplifies an edge detection filter (the vertical direction) in the embodiment according to one or more aspects of the present invention.

FIG. 17 exemplifies an accentuating filter (the accentuation level: high) in the embodiment according to one or more aspects of the present invention.

FIG. 18 exemplifies an accentuating filter (the accentuation level: low) in the embodiment according to one or more aspects of the present invention.

FIG. 19 exemplifies a smoothing filter (the smoothing level: high) in the embodiment according to one or more aspects of the present invention.

FIG. 20 exemplifies a smoothing filter (the smoothing level: low) in the embodiment according to one or more aspects of the present invention.

DETAILED DESCRIPTION

It is noted that various connections are set forth between elements in the following description. It is noted that these connections in general and, unless specified otherwise, may be direct or indirect and that this specification is not intended to be limiting in this respect. Aspects of the invention may be implemented in computer software as programs storable on computer-readable media including but not limited to RAMs, ROMs, flash memory, EEPROMs, CD-media, DVD-media, temporary storage, hard disk drives, floppy drives, permanent storage, and the like.

Hereinafter, an embodiment according to aspects of the present invention will be described with reference to the accompany drawings. In the embodiment, aspects of the present invention are applied to a Multi-Function Peripheral (MFP) provided with a scanner function, a printer function, and a facsimile function.

[Configuration of MFP]

Figure 1:
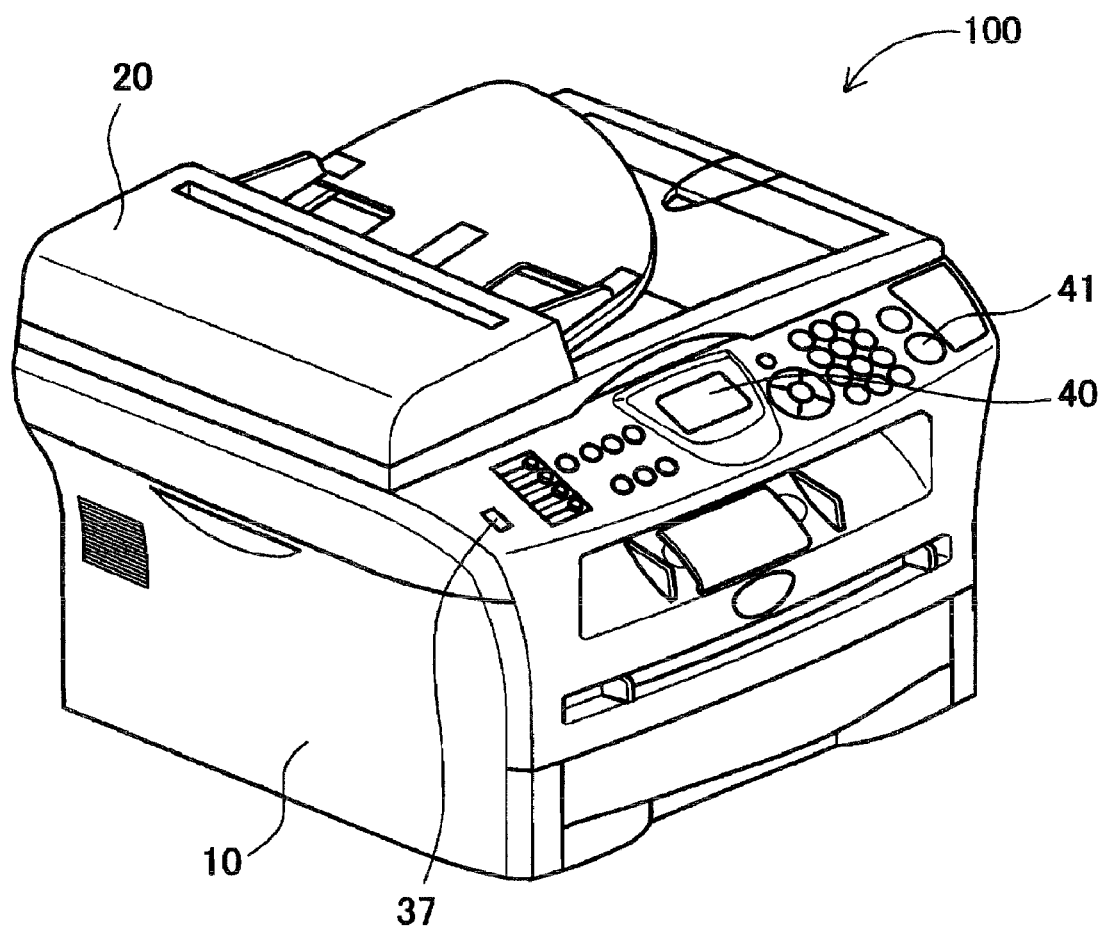
FIG. 1 is an external view of a Multi-Function Peripheral (MFP) in an embodiment according to one or more aspects of the present invention.

As illustrated in FIG. 1, an MFP 100 in the embodiment includes an image forming unit 10 configured to print an image on a sheet, and an image scanning unit 20 configured to scan an image on a document sheet. It is noted that an image forming method of the image forming unit 10 may be an electrophotographic method or an inkjet method. Further, the image forming unit 10 may be configured to form a color image or designed just for monochrome image formation.

The image scanning unit 20 includes an operation panel provided at a front face side. The operation panel has a button group 41 that contains various buttons such as a start key, a stop key, a numeric keypad, a display unit 40 configured with a Liquid Crystal Display (LCD), and a USB interface 37. The button group 41 or the display unit 40 makes it possible to display an operational state or accept an input given through a user operation.

[Configuration of Scanner Unit]

Figure 2:
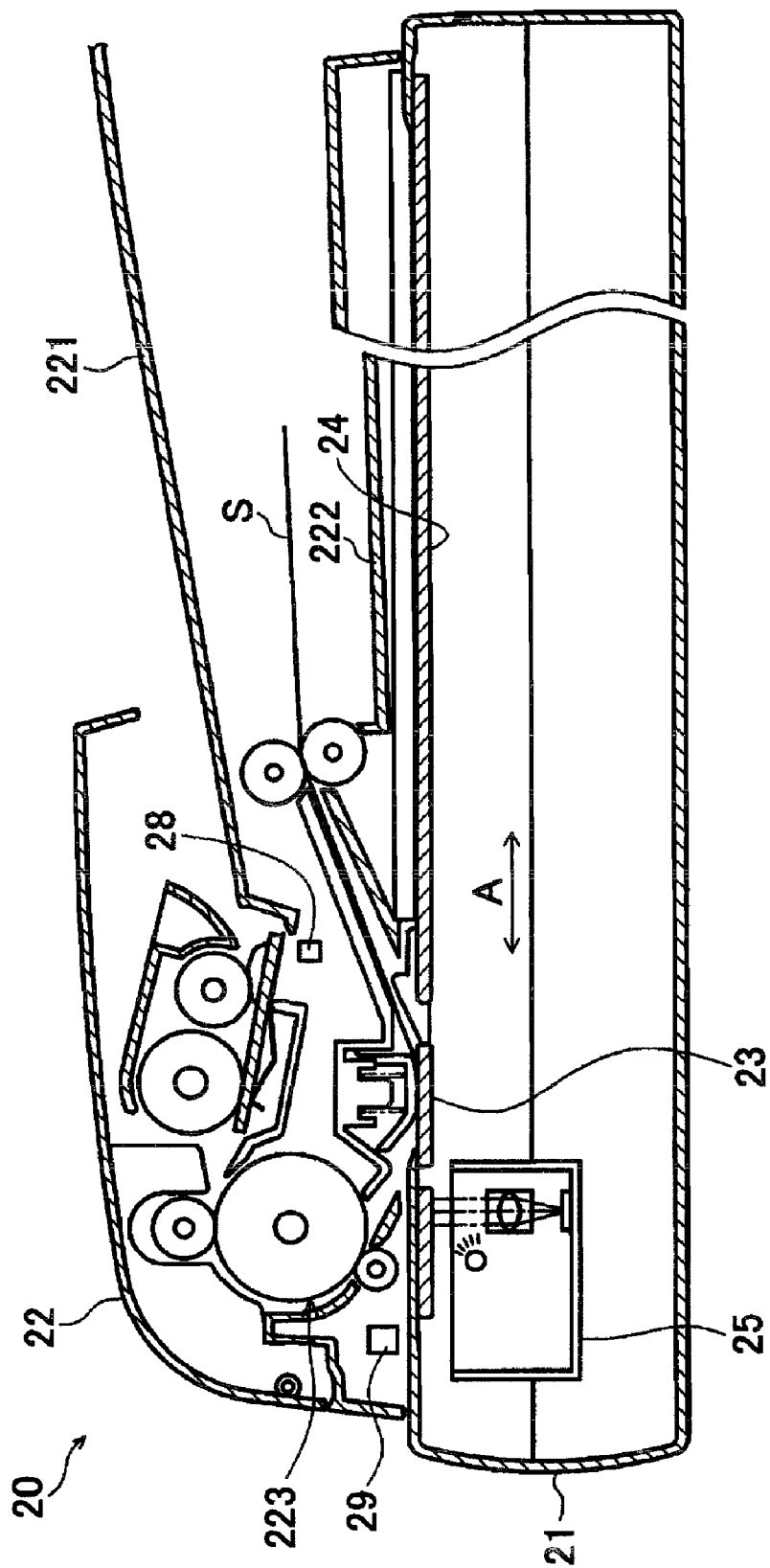
FIG. 2 is a cross-sectional view schematically showing a configuration of an image scanning unit of the MFP in the embodiment according to one or more aspects of the present invention.

As illustrated in FIG. 2, the image scanning unit 20 includes a scanner unit 21 configured to scan an image on a document sheet (for example, a document sheet S in FIG. 2), and an Automatic Document Feeder (ADF) 22 configured to automatically feed document sheets. A main body of the ADF 22 is rotatably supported by a supporter (not shown) provided at an upper end of the scanner unit 21 and doubles as a cover for covering an upper surface of the scanner unit 21. The scanner unit 21 has two transparent platen glasses 23 and 24 disposed in an upper surface thereof, and an image sensor 25 disposed therein.

The ADF 22 has a document tray 221 configured to be loaded with document sheets to be scanned, and a catch tray 222 configured to be loaded with document sheets already scanned. The document tray 221 is provided above the catch tray 222. Further, inside the ADF 22, a sheet feeding path 223 is provided to connect the document tray 221 and the catch tray 222. The ADF 22 picks up document sheets stacked on the document tray 221 on a sheet-by-sheet basis, and sequentially feeds the document sheets to a position facing the platen glass 23 (hereinafter, referred to as an "ADF glass 23." After that, the document sheets scanned are ejected onto the catch tray 222.

As methods for scanning a document sheet, a flatbed method for scanning a static sheet and an ADF method for scanning a sheet being conveyed are provided. In the case of the flatbed method, document sheets to be scanned are placed on the platen glass 24 (hereinafter referred to as an "FB glass 24") on a sheet-by-sheet basis. In such as situation, the image sensor 25 scans a line of image on the document sheet in a main scanning direction while moving in an auxiliary scanning direction (a direction indicated by an arrow A in FIG. 2, which is perpendicular to the main scanning direction). Meanwhile, in the case of the ADF method, document sheets to be scanned are stacked on the document tray 221. Then, the image sensor 25 is moved to a position facing the ADF glass 23 and set still there. In such a situation, each of the document sheets is sequentially fed to a position facing the image sensor 25 across the ADF glass 23, and an image on the document sheet is scanned on a line-by-line basis in the main scanning direction.

Further, the ADF 22 includes a document sensor 28 that is disposed around a feed-in entrance for document and configured to detect a document sheet existing at the feed-in entrance, and an open-close sensor 29 that is disposed adjacent to the supporter (not shown) for rotatably supporting the ADF 22 and configured to detect whether the ADF 22 is opened. The document sensor 28 is employed for determining whether a document sheet is placed on the document tray 221. The open-close sensor 29 is employed for determining whether the ADF 22 covers the FB glass 24.

[Electrical Configuration of MFP]

Figure 3:
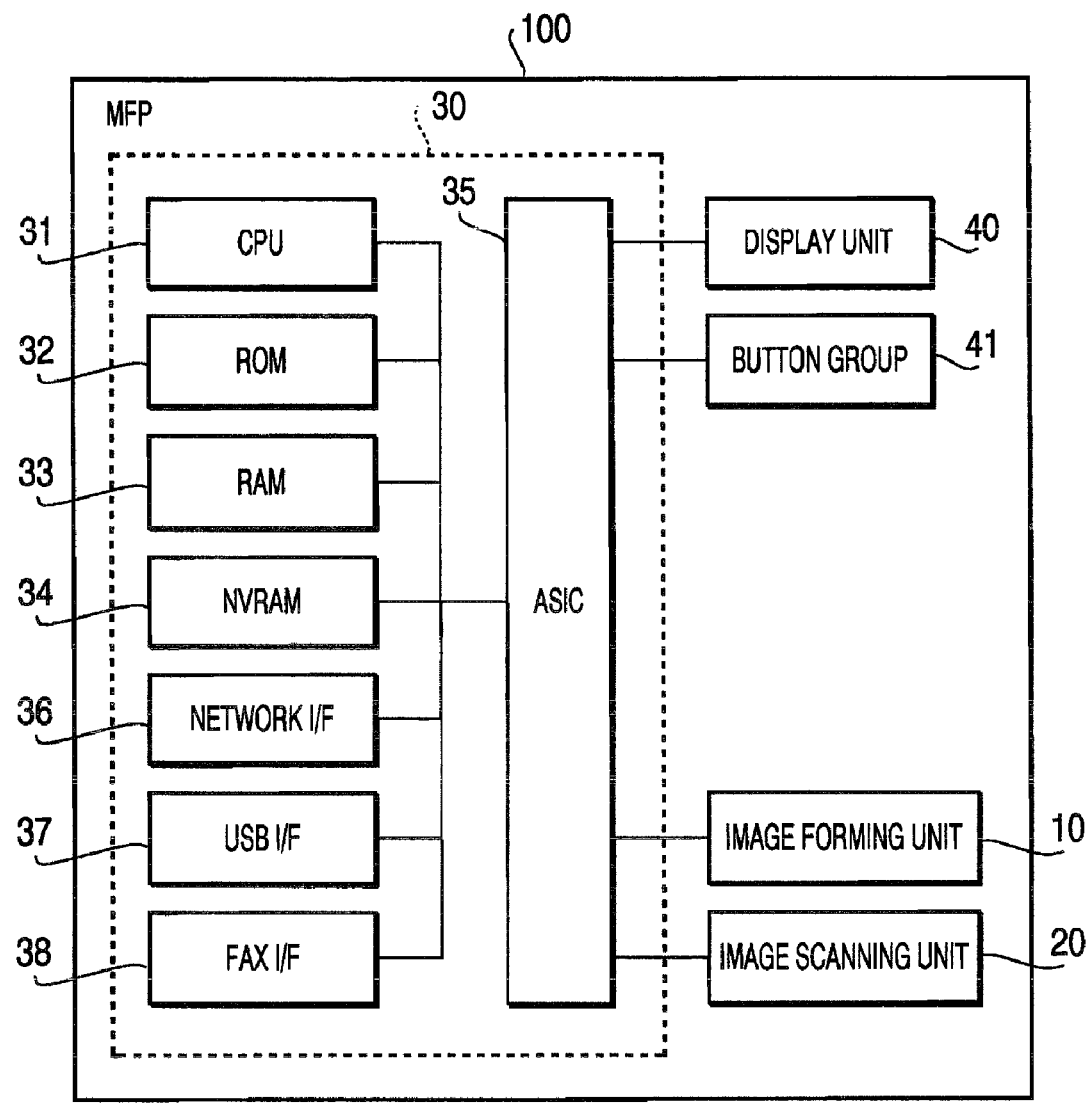
FIG. 3 is a block diagram schematically showing an electrical configuration of the MFP in the embodiment according to one or more aspects of the present invention.

Subsequently, an electrical configuration of the MFP 100 will be set forth. As shown in FIG. 3, the MFP 100 has a controller 30, which includes a CPU 31, a ROM 32, a RAM 33, an NVRAM 34, an ASIC 35, a network interface 36, a USB interface 37, and a FAX interface 38.

The ROM 32 stores various control programs for controlling the MFP 100, an image processing program, various setting values, and various initial values. The RAM 33 is employed as a work area into which the various control programs are loaded or a memory area to temporarily store image data.

The ASIC 35 is electrically linked with the image forming unit 10, the image scanning unit 20, the display unit 40, and the button group 41. For example, the ASIC 35 acquires signals for image data from the image scanning unit 20. In addition, the ASIC 35 outputs signals for forming a desired image to the image forming unit 10. Moreover, the ASIC 35 accepts signals issued through user operations of the button group 41. Furthermore, the ASIC 35 outputs signals to be displayed on the display unit 40.

The CPU 31 controls each constituent element included in the MFP 100 via the ASIC 35, in accordance with a control program read out from the ROM 32, while storing processing results for the control into the RAM 33 or the NVRAM 34. Further, the CPU 31 performs image processing for image data obtained from the image scanning unit 20, in accordance with the image processing program read out from the ROM 32.

The network interface 36 is connected with external information devices, and mutual data communication is established between the MFP 100 and the external information devices via the network interface 36. In addition, the FAX interface 38 is connected with a telephone line, and the MFP 100 can perform data communication with external facsimile machines via the FAX interface 38.

[Scanning Process by MFP]

Figure 4:
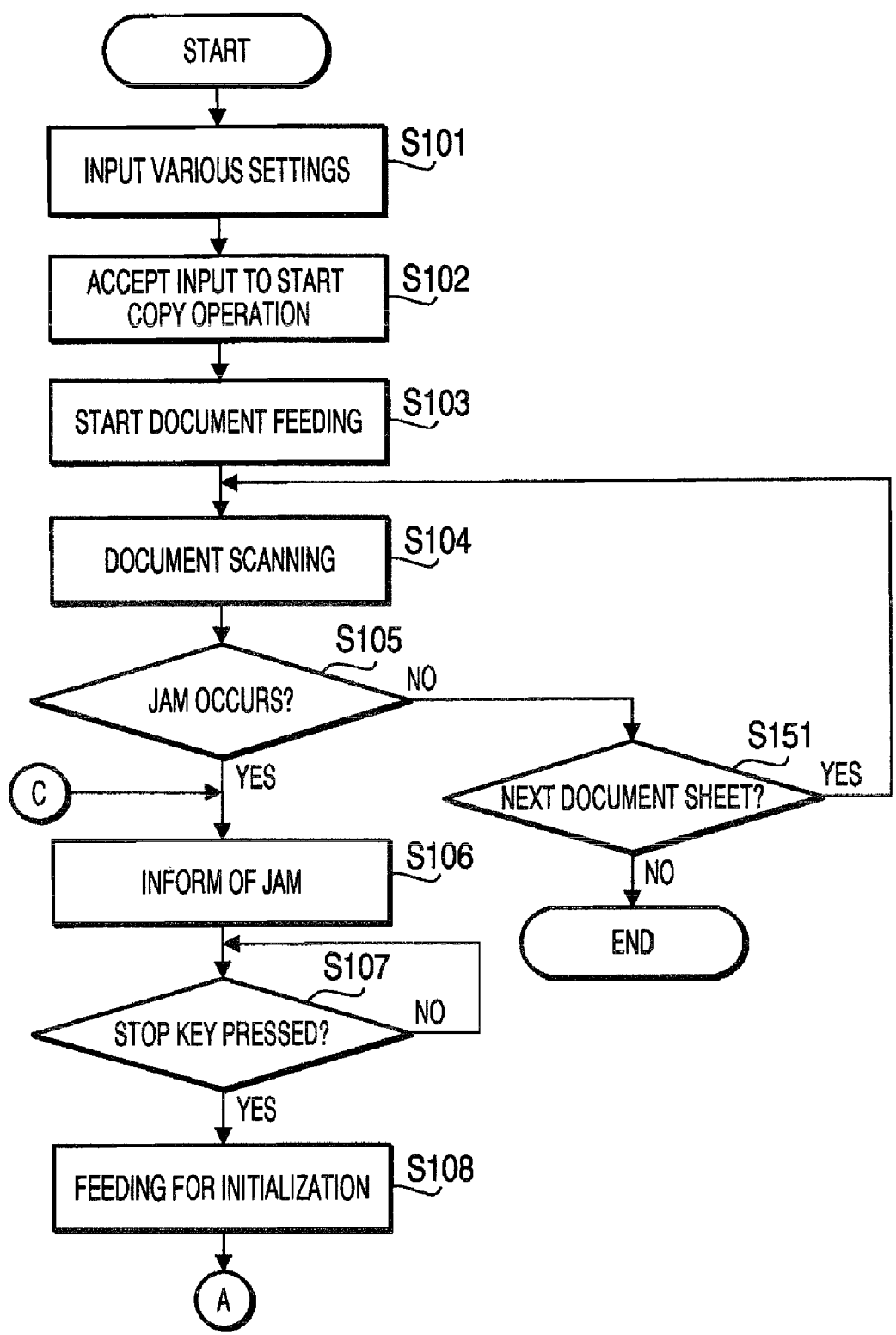
FIGS. 4 to 6 are flowcharts showing a procedure of a scanning process to be executed by the MFP in the embodiment according to one or more aspects of the present invention.

Subsequently, explanation will be given to set forth a procedure of a scanning process for scanning an image on a document sheet when the MFP 100 performs a copy operation, with reference to FIGS. 4 to 6.

First, the CPU 31 accepts inputs for setting the number of copies, image quality, a magnification, a feed tray, and various modes (S101). For example, as shown in FIG. 7, the display unit 40 displays setting values for the various settings. Additionally, inputs for the various settings are accepted through the button group 41. Then, an input given by pressing the start key is accepted as a trigger to start a copy operation (S102). The user sets document sheets to be scanned on the document tray 221 of the ADF 22 before pressing the start key.

Thereafter, when the user presses the start key, automatic feeding of the document sheets by the ADF 22 is launched (S103). Then, the document sheets automatically fed on a sheet-by-sheet basis are scanned by the image sensor 25 (S104). Specifically, in response to pressing the start key, the image sensor 25 moves to a position beneath the ADF glass 23. After that, the document sheets are fed onto the sheet feeding path 223 on a sheet-by-sheet basis, and when each of the document sheets passes on the ADF glass 23, an image on the sheet is scanned by the image sensor 25. Further, image processing is, as required, performed for the image data scanned. Moreover, as exemplified in FIG. 8, while the document sheets are normally being scanned, the CPU 31 displays on the display unit 40 a message that a copy operation (or a scanning operation) is in execution.

Next, the CPU 31 determines whether the document sheet being fed is jammed (S105). When it is determined that the document sheet being fed is not jammed (S105: No), the CPU 31 determines whether there is a next document sheet to be scanned (S151). The determination in S151 is made based on a signal issued by the document sensor 28. When it is determined that there is a next document sheet to be scanned (S151: Yes), the CPU 31 goes back to S104 to scan an image on the document sheet. Meanwhile, when it is determined that there is no next document sheet to be scanned (S151: No), the present process is terminated.

On the other hand, when it is determined that the document sheet being fed is jammed (S105: Yes), the CPU 31 interrupts the automatic document feeding and informs the user of the jam (S106). For example, as illustrated in FIG. 9, the CPU 31 displays on the display unit 40 a message that a jam occurs. Alternatively, the CPU 31 may inform of the jam with a voice massage or a warning sound.

Subsequently, the CPU 31 waits for the stop key to be pressed by the user (S107). The user removes one or more sheets that caused the jam (hereinafter referred to as "jammed sheets") and presses the stop key. When detecting the stop key pressed (S107: Yes), the CPU 31 performs document feeding for initialization (S108), in which, specifically, document sheets left inside the ADF 22 without being scanned are ejected onto the catch tray 222.

Figure 5:
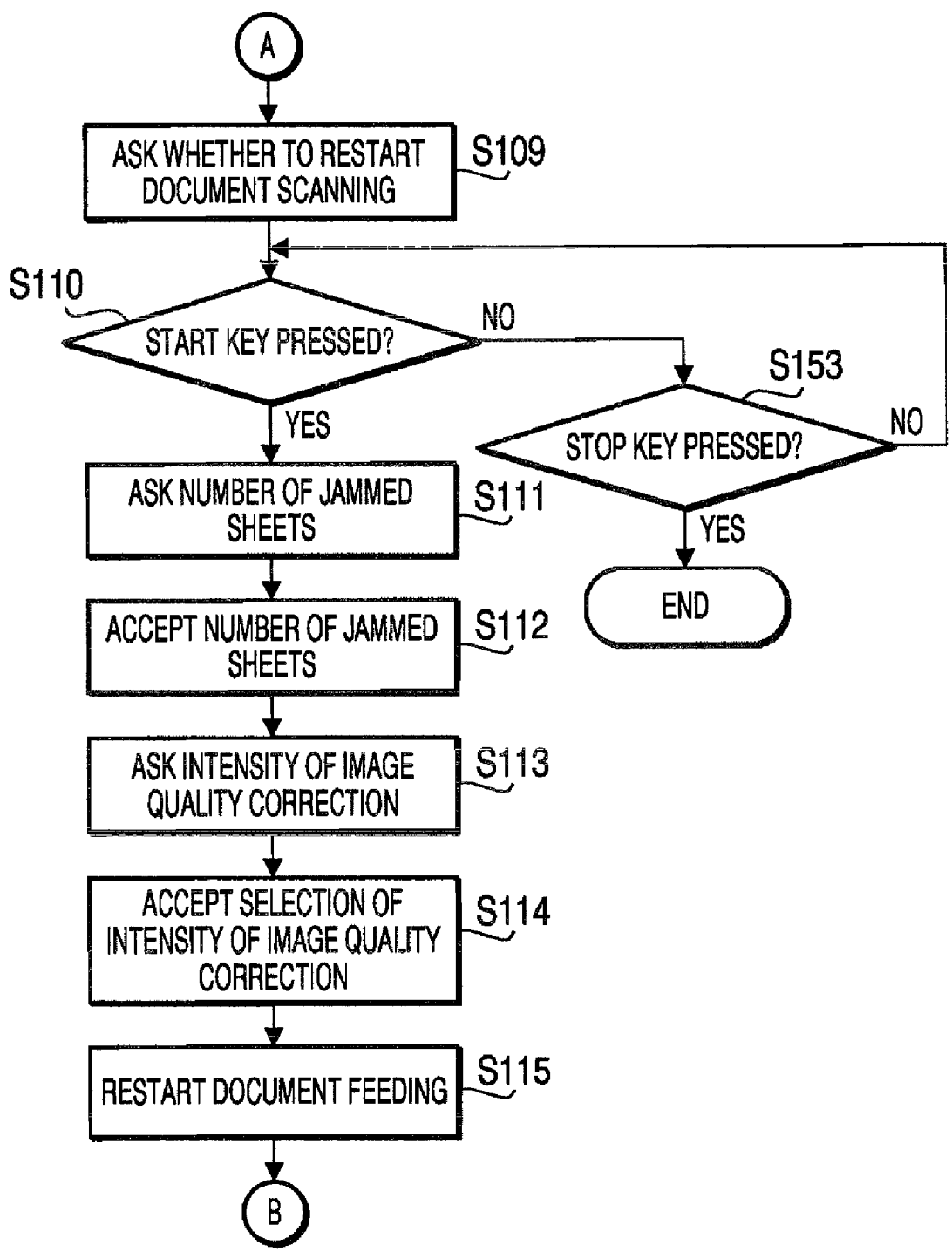
Figure 6:
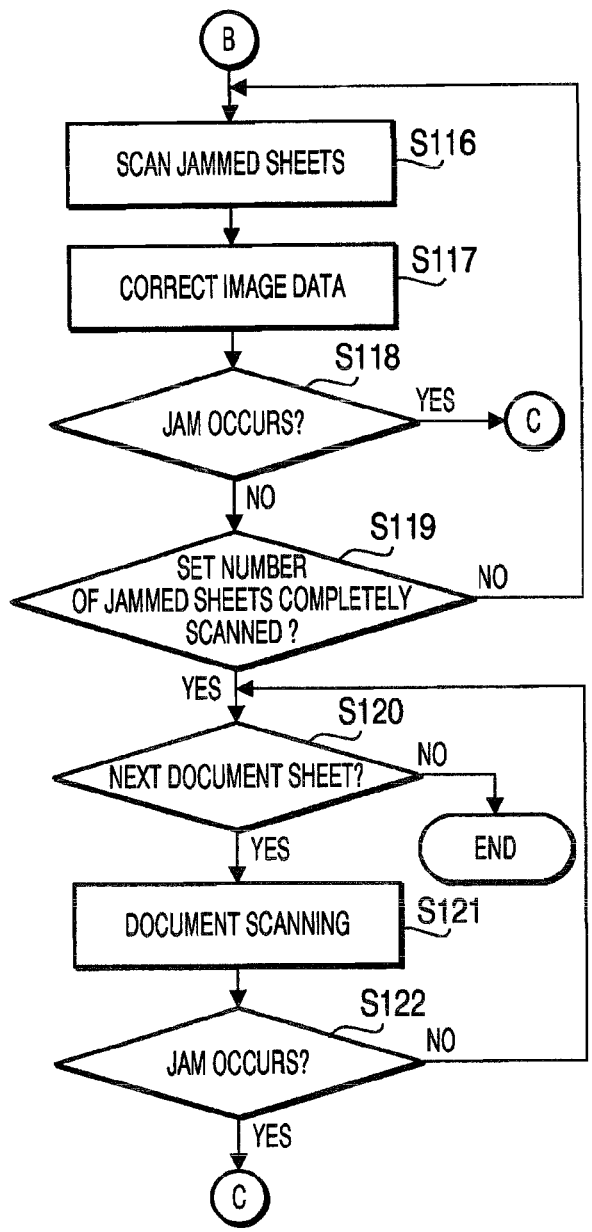

Next, the CPU 31 proceeds to a flowchart shown in FIG. 5 to ask the user whether to restart document scanning (S109). For example, the CPU 31 displays on the display unit 40 a message as shown in FIG. 10, and sets the start key as a trigger to continue the job and the stop key as a trigger to terminate the job. Then, the CPU 31 waits for the start key to be pressed (S110) or the stop key to be pressed (S153).

When the stop key is pressed (S153: Yes), the CPU 31 terminates the present process and canceled the copy operation. Specifically, image data scanned by the time when the jam occurs is deleted from the RAM 33. Thereby, the scanning process can be reattempted from the beginning. Meanwhile, when the start key is pressed (S110: Yes), the CPU 31 advances to S111 to resume the document scanning. The user sets the document sheets with the "jammed sheets" as top sheets on the document tray 221 of the ADF 22 before pressing the start key.

In the scanning process, the "jammed sheets" are deemed as document sheets to be scanned immediately after the document feeding is restarted. Then, when resuming the document scanning, the CPU 31 first asks the user about the number of the "jammed sheets" (S111). Namely, as only one sheet is not necessarily damaged in an event of jam, the number of damaged sheets is set. For example, the CPU 31 displays on the display unit 40 a message as shown in FIG. 11 and accepts an input of the number of the "jammed sheets" through the numeric keypad of the button group 41 (S112).

Subsequently, the CPU 31 asks the user about an intensity of correction when performing an image quality correction for the image data of the "jammed sheets" (S113). Namely, as the damage level of the "jammed sheets" varies depending on the level of the jam, the intensity of correction that indicates the degree of correction is set in order to perform an image quality correction depending on the damage levels of the "jammed sheets." For example, as shown in FIG. 12, "Low" and "High" are provided as the intensity of correction, and the CPU 31 accepts user selection of one of three options that includes "No Correction" where no correction is performed (S114). After setting the intensity of correction, the CPU 31 launches the document feeding with the ADF 22 (S115). It is noted that the order of setting the number of the "jammed sheets" and the intensity of correction may be reversed.

Subsequently, the CPU 31 advances to a flowchart shown in FIG. 6 to scan the "jammed sheets" automatically fed on a sheet-by-sheet basis with the image sensor 25 (S116). Then, according to the intensity of correction set in S114, the CPU 31 corrects the image data scanned (S117). Namely, the image quality correction for jammed sheets is performed for the sheets deemed as the "jammed sheets."

Hereinafter, the process executed in S117 to correct the image quality will be described. FIG. 13 shows correction parameters for each document type. In the process of S117, the CPU 31 discriminates the document types and performs the image quality correction suitable for each document type. Specifically, two document types—a "character document" that mainly contains characters and a "photograph" that mainly contains photographs are provided as the document types. Then, an area of the "character document" and an area of the "photograph" are differentiated from each other on a document sheet.

A common correction process between the "character document" and the "photograph" includes a gamma correction for correcting light grey to white. FIG. 14 shows relationships between the input value and the output value in the gamma correction in the embodiment. As shown in FIG. 14, the gamma correction for jammed sheets makes the output value closer to white than a gamma correction for normal sheets (see a solid line in FIG. 14). Further, the higher the intensity of correction is, the larger the degree to which the output value is made close to white is. It is noted that when the document type is the "photograph," the degree to which the output value is made close to white is reduced relatively in comparison with the "character document" to place priority on maintaining gray levels.

Additionally, a threshold for edge detection is set high such that folds or wrinkles of the "jammed sheets" are not recognized as edges. For the edge detection, common filters as exemplified in FIG. 15 (the horizontal direction) and FIG. 16 (the vertical direction) are employed. In the edge detection, when a pixel value, which results from a predetermined filter being applied to an intended pixel (a central pixel) and pixels adjacent to the intended pixel in 8 directions, is equal to or more than the threshold for edge detection, the intended pixel is determined to be an edge in a predetermined direction. Meanwhile, when the pixel value is less than the threshold, the intended pixel is determined not to be an edge. Therefore, when the threshold for edge detection is set high, the intended pixel is not likely to be determined as an edge. Namely, by setting the threshold for edge detection high, folds or wrinkles of the "jammed sheets" are hard to be detected as edges and to be inappropriately accentuated. Further, the intensity of the edge detection may be adjusted by changing coefficients of the filter or increasing the number of pixels involved by the filtering.

In addition, as one of features of the correction for the "character document," reducing a threshold for digitizing is cited. The higher the intensity of correction, the lower the threshold for digitizing is. By reducing the threshold for digitizing, light gray is easier to be determined as white. Thereby, it is possible to render folds or wrinkles of the "jammed sheets" close to white and undistinguished on the scanned image data. In the case of the "photograph," the threshold for digitizing is kept unchanged to place priority on maintaining the gray levels.

Meanwhile, as one of features of the correction for the "photograph," applying a smoothing filter to edges is cited. By applying the smoothing filter to edges, it is possible to render folds or wrinkles of the "jammed sheets" undistinguished. In normal image processing, based on results of the edge detection, an accentuating filter is applied to edges in areas of the "character document," and a smoothing filter is applied to portions other than edges in areas of the "photograph." As accentuating filters, for example, common filters as shown in FIG. 17 (the accentuation level: low) and FIG. 18 (the accentuation level: high) are employed. Further, as smoothing filters, for example, common filters as shown in FIG. 19 (the smoothing level: low) and FIG. 20 (the smoothing level: high) are employed. In the case of the "character document," the accentuating filters are applied with priority placed on accentuating edges. However, in this respect, as the intensity of correction for jammed sheets is enhanced, the degree of accentuating edges is decreased.

The scanning process will be set forth continuously. After the image correction in S117, the CPU 31 determines whether a document sheet currently being conveyed is jammed (S118). When it is determined that a document sheet currently being conveyed is jammed (S118: Yes), the CPU 31 goes back to S106 to repeat steps to be executed when a jam occurs. Meanwhile, when it is determined that a document sheet currently being conveyed is not jammed (S118: No), the CPU 31 determines whether the jammed sheets of the number set in S112 are completely scanned (S119). When the jammed sheets of the set number are not completely scanned (S119: No), the CPU 31 goes back to S116 to repeat scanning the jammed sheets. Meanwhile, when the jammed sheets of the set number are completely scanned (S119: Yes), the CPU 31 advances to an operation of scanning normal sheets to be executed in S120 and the following steps.

In the operation of scanning normal sheets, the CPU 31 first determines whether there is a next document sheet to be scanned (S120). In other words, it is determined whether there is a document sheet left on the document tray 221. When there is no next document sheet to be scanned (S120: No), the present process is terminated. Meanwhile, when there is a next document sheet to be scanned (S120: Yes), an image on the document sheet is scanned (S121). Then, the CPU 31 determines whether the sheet currently being conveyed is jammed (S122). When determining that the sheet currently being conveyed is not jammed (S122: No), the CPU 31 goes back to S120 to scan remaining sheets. Meanwhile, when determining that the sheet currently being conveyed is jammed (S122: Yes), the CPU 31 goes back to S106 to perform the steps to be executed when a jam occurs.

After completing the aforementioned scanning process, the CPU 31 proceeds to an image forming process for forming an image on a sheet based on the scanned image data or image data resulting from image processing. It is noted that explanation of the image forming process will be omitted since the image forming process is the same as a known process.

Hereinabove, as described in detail, according to the MFP 100 in the embodiment, when the automatic document feeding by the ADF 22 is interrupted due to a jam, documents sheets scanned immediately after resuming the document feeding are determined as damaged sheets. Further, the correction conditions include the correction conditions for normal document sheets and the correction conditions for damaged sheets. When intended document sheets to be scanned are the "jammed sheets," the MFP 100 performs image processing under the correction conditions for the "jammed sheets." Thereby, it is possible to reduce the influence of damages in the "jammed sheets" on image quality.

Additionally, when the document feeding is resumed, the number of the "jammed sheets" is set, and the image processing for jammed sheets is performed for the set number of sheets. Namely, even though plural document sheets are damaged, the image processing is performed appropriately for sheets of the number which corresponds to the number of the "jammed sheets."

Further, when the document feeding is resumed, with the intensity of correction being set, the image processing for jammed sheets is performed depending on the damage levels of the "jammed sheets." Namely, by adjusting the intensity of correction depending on the damage level, it is possible to perform more appropriate image processing.

Moreover, plural correction conditions are provided to each document type such as the "character document" and the "photograph." The correction condition is changed depending on the document type. Namely, by adjusting the intensity of correction depending on the document type, it is possible to perform more appropriate image processing.

Hereinabove, the embodiment according to aspects of the present invention has been described. The present invention can be practiced by employing conventional materials, methodology and equipment. Accordingly, the details of such materials, equipment and methodology are not set forth herein in detail. In the previous descriptions, numerous specific details are set forth, such as specific materials, structures, chemicals, processes, etc., in order to provide a thorough understanding of the present invention. However, it should be recognized that the present invention can be practiced without reapportioning to the details specifically set forth. In other instances, well known processing structures have not been described in detail, in order not to unnecessarily obscure the present invention.

Only an exemplary embodiment of the present invention and but a few examples of its versatility are shown and described in the present disclosure. It is to be understood that the present invention is capable of use in various other combinations and environments and is capable of changes or modifications within the scope of the inventive concept as expressed herein. For example, the following modifications are possible.

In the aforementioned embodiment, aspects of the present invention are applied to an MFP. However, aspects of the present invention may be applied to any apparatus provided with an image scanning function such as a copy machine, a scanner, and a facsimile machine.

In the aforementioned embodiment, the number of the "jammed sheets" is input manually by the user. However, the number of the "jammed sheets" may automatically be determined. For example, plural sensors may be provided on the sheet feeding path 223 of the ADF 22 to acquire the number of sheets left on the sheet feeding path 223 due to a jam caused and then automatically determine the acquired number as the number of the "jammed sheets."

In the aforementioned embodiment, the image data scanned by the time when a jam occurs is saved, and the document scanning is resumed from the "jammed sheets" after the jam is settled. However, for example, in an apparatus which cannot save the image data scanned by the time when a jam occurs, the page numbers of the "jammed sheets" may be input when the document feeding is resumed, all the document sheets may be again scanned, and the image quality correction for jammed sheets may be performed for pages of the input page numbers. Namely, the "jammed sheets" may be specified by the page numbers.

In the aforementioned embodiment, the correction of the "jammed sheets" is performed during the copy operation with the ADF 22. However, aspects of the present invention may be applied to an image scanner that does not include an ADF. For example, a damaged-document mode to scan damaged document sheets is provided to the image scanner as an operation mode. When the operation mode is set to the damaged-document mode, the intensity of correction may be input, and then a correction for damaged sheets may be performed with the input intensity after document scanning in the flatbed method. Namely, the "jammed sheets" may be specified by the operation mode.

In the aforementioned embodiment, all the image processing is performed by the CPU 31. However, the ASIC 35 may perform image processing under the correction conditions in accordance with an instruction issued by the CPU 31. In this case, the ASIC 35 is provided with a gamma correction processor, an edge detector, and an accentuating/smoothing filter.

Furthermore, the CPU 31 may automatically determine whether an intended document sheet is the "jammed sheet," based on image data scanned by the scanner unit 21. In this case, for example, non-processed image data scanned by the scanner unit 21 is temporarily stored on the RAM 33. Then, by performing image processing based on predetermined correction conditions for the non-processed image data to accentuate folds and/or wrinkles, the CPU 31 determines whether the original document contains damage. When determining that the original document contains damage, the CPU 31 performs the image processing under the correction conditions for the "jammed sheets." It is noted that when the document scanning is resumed after the jam is settled, the determination by the CPU 31 as to whether the original document contains damage may be made for all or a predetermined number of document sheets that includes or follows a page from which the document scanning is resumed. Additionally, after it is determined that an intended document is not a damaged document, the determination as to whether the original document contains damage may not be made.

What is claimed is:

1. An image scanner comprising:
    a scanning unit configured to scan images on document sheets;
    an image processing unit configured to perform image processing for the images scanned by the scanning unit under a predetermined condition;
    an identifying unit configured to identify one or more damaged sheets among the document sheets to be scanned;
    a condition setting unit configured to set a specific condition under which the image processing is to be performed for images scanned from the damaged sheets identified by the identifying unit; and
    a level acquiring unit configured to acquire a damage level that represents a degree to which the damaged sheets are damaged,
    wherein the condition setting unit is configured to set the specific condition depending on the damage level acquired by the level acquiring unit.

2. The image scanner according to claim 1, further comprising:
    a feeder configured to perform document feeding to feed the document sheets to be scanned to a scanning position;
    an interrupting unit configured to interrupt the document feeding when a feeding error occurs; and
    a resuming unit configured to resume the document feeding after the feeding error is settled,
    wherein the identifying unit is configured to identify, as the damaged sheets, one or more document sheets to be scanned immediately after the resuming unit has resumed the document feeding.

3. The image scanner according to claim 2, further comprising:
    an inquiring unit configured to, when the document feeding is interrupted by the interrupting unit, inquire whether to resume the document feeding; and
    an accepting unit configured to accept an instruction to resume the document feeding,
    wherein the identifying unit is configured to identify, as the damaged sheets, one or more document sheets to be scanned immediately after the resuming unit has resumed the document feeding, in response to the instruction accepted by the accepting unit.

4. The image scanner according to claim 2, further comprising a number acquiring unit configured to acquire a total number of the damaged sheets, wherein the identifying unit is configured to identify the acquired total number of document sheets as the damaged sheets.

5. The image scanner according to claim 1, further comprising a number acquiring unit configured to acquire a total number of the damaged sheets,
wherein the identifying unit is configured to identify the acquired total number of document sheets as the damaged sheets.

6. The image scanner according to claim 1, further comprising a type determining unit configured to determine a document type of each scanned object on the damaged sheets identified,
wherein the condition setting unit is configured to set the specific condition depending on the determined document type of each scanned object on the damaged sheets.

7. The image scanner according to claim 1, further comprising a type determining unit configured to determine a document type of each scanned object on the damaged sheets identified,
wherein the condition setting unit is configured to set the specific condition depending on the determined document type of each scanned object on the damaged sheets.

8. The image scanner according to claim 1,
wherein the specific condition set by the condition setting unit is different from a condition under which the image processing is performed for images scanned from undamaged sheets other than the damaged sheets.

9. A computer readable medium encoded with computer executable instructions, the instructions causing a computer to perform:
a scanning step of scanning images on document sheets;
an image processing step of performing image processing for the images scanned in the scanning step under a predetermined condition;
an identifying step of identifying one or more damaged sheets among the document sheets to be scanned;
a condition setting step of setting a specific condition under which the image processing is to be performed for images scanned from the damaged sheets identified in the identifying step; and
a level acquiring step of acquiring a damage level that represents a degree to which the damaged sheets are damaged,
wherein the condition setting step sets the specific condition depending on the damage level acquired by the level acquiring step.

10. An image scanner comprising:
a scanning unit configured to scan images on document sheets;
an image processing unit configured to perform image processing for the images scanned by the scanning unit based on a predetermined scanned-image correction condition;
an identifying unit configured to identify one or more damaged sheets among the document sheets to be scanned;
a condition setting unit configured to set a specific scanned-image correction condition for the image processing unit to perform the image processing for images scanned from the damaged sheets identified by the identifying unit;
a feeder configured to perform document feeding to feed the document sheets to be scanned to a scanning position;
an interrupting unit configured to interrupt the document feeding when a feeding error occurs; and
a resuming unit configured to resume document scanning after the feeding error is settled,
wherein the identifying unit is configured to identify, as the damaged sheets, one or more document sheets to be scanned immediately after the resuming unit has resumed the document feeding.

* * * * *